United States Patent
Lukas

(10) Patent No.: US 9,470,542 B2
(45) Date of Patent: Oct. 18, 2016

(54) METHOD FOR THE SUPPLY OF ENCODED GEOIMAGE DATA

(75) Inventor: Klaus Lukas, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 2083 days.

(21) Appl. No.: 12/311,349

(22) PCT Filed: Sep. 21, 2007

(86) PCT No.: PCT/EP2007/060043
§ 371 (c)(1),
(2), (4) Date: Mar. 27, 2009

(87) PCT Pub. No.: WO2008/037664
PCT Pub. Date: Apr. 3, 2008

(65) Prior Publication Data
US 2009/0276152 A1      Nov. 5, 2009

(30) Foreign Application Priority Data

Sep. 28, 2006  (DE) .................. 10 2006 045 887

(51) Int. Cl.
G01C 21/04   (2006.01)
G01C 21/26   (2006.01)
G01C 21/36   (2006.01)

(52) U.S. Cl.
CPC ................... *G01C 21/3647* (2013.01)

(58) Field of Classification Search
USPC ....................................... 707/208
See application file for complete search history.

(56) References Cited

U.S. PATENT DOCUMENTS

| 6,434,479 | B1 | 8/2002 | Kondou et al. | |
|---|---|---|---|---|
| 7,199,800 | B2 | 4/2007 | Ogawa | |
| 7,342,516 | B2 | 3/2008 | Kato et al. | |
| 7,552,011 | B2 | 6/2009 | Ishii et al. | |
| 2004/0030493 | A1* | 2/2004 | Pechatnikov et al. | ........ 707/208 |
| 2004/0066316 | A1 | 4/2004 | Ogawa | |
| 2004/0128070 | A1* | 7/2004 | Schmidt et al. | ............. 701/211 |
| 2005/0049782 | A1 | 3/2005 | Nakano | |
| 2005/0140524 | A1 | 6/2005 | Kato et al. | |
| 2006/0142943 | A1 | 6/2006 | Park | |
| 2006/0167629 | A1 | 7/2006 | Ishii et al. | |
| 2007/0233369 | A1 | 10/2007 | Ng et al. | |

FOREIGN PATENT DOCUMENTS

| DE | 197 56 297 A1 | 7/1999 |
|---|---|---|
| DE | 100 43 966 | 3/2002 |
| DE | 103 36 581 A1 | 4/2004 |
| EP | 0 379 198 A2 | 7/1990 |
| EP | 1 076 452 A2 | 2/2001 |
| EP | 1 152 383 A2 | 11/2001 |
| EP | 1 701 133 A2 | 9/2006 |
| EP | 1 757 904 A1 | 2/2007 |
| JP | 2001-118193 | 4/2001 |
| JP | 2002-318118 | 10/2002 |
| JP | 2003-51094 A | 2/2003 |
| JP | 2005-10384 A | 1/2005 |
| JP | 2005-241613 | 9/2005 |
| JP | 2006-200995 | 8/2006 |
| WO | 2006/096044 A1 | 9/2006 |
| WO | 2007/115615 A2 | 10/2007 |

OTHER PUBLICATIONS

German Office Action for Application No. 102006045887.7 dated Aug. 23, 2007.
International Search Report for Application No. PCT/EP2007/060043; mailed Feb. 7, 2008.
Partial German translation Japanese Patent Application 2001-118193.
German translation of Japanese Office Action issued Jul. 20, 2011 in corresponding Japanese Patent Application 2009-529670.

* cited by examiner

*Primary Examiner* — Resha Desai
(74) *Attorney, Agent, or Firm* — Slayden Grubert Beard PLLC

(57) ABSTRACT

Uncoded geographical image data for a pre-defined geographical region is stored in a server unit and at least one wireless communication interface is provided between the server unit and at least one navigation receiver module. At least one position information message is transmitted from the navigation receiver module to the server unit and an expectancy range is selected in the server unit according to the transmitted position information from the pre-defined geographical region. Uncoded geoimage data reproducing the expectancy range is determined and the first uncoded geoimage data is encoded in the server unit. The encoded geoimage data is then transferred to the navigation receiver module from the server unit via the wireless communication interface.

13 Claims, 2 Drawing Sheets

METHOD FOR THE SUPPLY OF ENCODED GEOIMAGE DATA

CROSS REFERENCE TO RELATED APPLICATIONS

This application is the U.S. national stage of International Application No. PCT/EP2007/060043, filed 21 Sep. 2007 and claims the benefit thereof. The International Application claims the benefits of German Application No. 10 2006 045 887.7 filed on 28 Sep. 2006, both applications are incorporated by reference herein in their entirety.

BACKGROUND

Described below is a method for the supply of encoded geoimage data from a server unit to at least one navigation receiver module, a geographical region being pre-defined by uncoded geoimage data stored in the server unit and at least one wireless communication interface being present between the server unit and the at least one navigation receiver module.

Navigation systems have become increasingly common in recent years. The navigation systems are frequently fixedly installed in vehicles or retrofitted as mobile navigation systems. In addition to a navigation receiver module for receiving "global positioning system" (GPS) position signals and/or speed signals, such a navigation system includes at least one display unit on which a map extract which may be based on vector graphics, for example a country map or a city map, is shown. In this connection, it is preferable that the map extract is shown in which the object associated with the navigation receiver module is currently located. Furthermore, in addition to the current position information, directional information and/or speed information may also be derived from the GPS position signals received, and possibly displayed on a further display unit or superimposed on the map extract shown.

The map data required for producing the map extract on the display unit is frequently stored on a removable data carrier, for example a DVD ("digital video disc"). The removable data carrier thus contains all the map data which is relevant for the representation of a defined geographical region, for example individual countries or regions. Using the position information determined by the navigation receiver module, the map data relevant to the map extract to be displayed is selected from the map data and shown on the display unit. The map data shown, for example, using vector graphics has in this case a sufficiently high resolution to be able to provide the user of the navigation system with a clear impression of the section of road and/or the route still to be covered.

In future navigation systems, in addition to the aforementioned navigation information, the display of geographical image data, i.e. so-called "geoimage data" is planned. Such geoimage data refers to aerial photographs of a pre-defined geographical region of the surface of the earth produced by a satellite unit, which for example in addition to the map data may be made available in a fixed manner in the navigation system and may be displayed on the display unit. As a result, the user gains additional information.

The representation of such geoimage data on the screen of a navigation system, however, requires the data to be edited and namely, in particular, the data format to be adapted to the respective configuration of the display unit provided in the navigation system. In navigation systems currently known, fixed geoimage data is exclusively used. A contemporaneous supply of current geoimage data to the navigation receiver module of a navigation system, for example in real time or merely with a slight time delay, is not able to be implemented by the known systems. A real-time supply of data frequently fails, due to the fact that the quantity of data which has to be transmitted within a very short period of time from, for example, a central server unit to a navigation receiver module arranged decentrally is too high. The transmission capacity of currently available wireless communication interfaces is not sufficient for this purpose.

For reducing the quantity of data to be transmitted, a plurality of different data encoding methods are known from the related art, in particular methods for image data encoding. Such methods for image data encoding, for example, skillfully use specific individual aspects of the image content, in order to permit almost loss-free encoding of the image data. To this end, the image content is analyzed, individual image areas being assigned to various data groups, and the various data groups respectively being subjected to variable encoding, and namely such that a representation of the image of the highest possible value in qualitative terms represented by the encoded image data is possible. Known encoding methods thus use variable coding depths, in particular for regions in which quality losses are able to be taken into account, i.e. image data which reproduces the face of a person is encoded with a higher coding depth than the image data relating to the background.

SUMMARY

Proceeding from the aforementioned related art, a method supplies encoded geoimage data from a server unit to at least one navigation receiver module, which permits a contemporaneous supply of geoimage data.

The essential aspect of the method is seen to be that at least one position information message is transmitted from the navigation receiver module to the server unit. Subsequently, an expectancy range is selected in the server unit according to the transmitted position information from the geographical region and first uncompressed geoimage data reproducing the selected expectancy range is determined. Finally, the first uncompressed geoimage data is compressed in the server unit and the first compressed geoimage data is transmitted from the server unit to the navigation receiver module via the at least one wireless communication interface. Advantageously, the method permits a marked reduction in the volume of data to be transmitted and thus a contemporaneous supply of geoimage data to a navigation system. This saves both transmission volume and also transmission time. Due to the reduced quantity of data, additionally a more frequent updating of the transmitted geoimage data is possible.

Particularly advantageously, in addition to the position information, directional information and/or speed information providing the current direction of movement of the navigation receiver module is transmitted and according to which the expectancy range is determined. The expectancy range thus indicates the geographical region which encompasses the current location of the object associated with the navigation system and within which the object will soon stop, taking into account the transmitted direction of movement and/or speed of movement.

Further advantageously, in addition to the expectancy range, the first geoimage data thereof being encoded with the highest coding depth, a buffer region encompassing the expectancy range is determined, the associated second geoimage data thereof, for example being encoded with an average coding depth. The remaining third geoimage data of the geographical region is encoded with a very low coding depth. Advantageously, therefore, the geoimage data is transmitted with variable encoding qualities according to the probability of its use in the navigation system.

BRIEF DESCRIPTION OF THE DRAWINGS

These and other aspects and advantages will become more apparent and more readily appreciated from the following description of an embodiment, taken in conjunction with the accompanying drawings of which.

DETAILED DESCRIPTION OF THE PREFERRED EMBODIMENT

Figure 1:
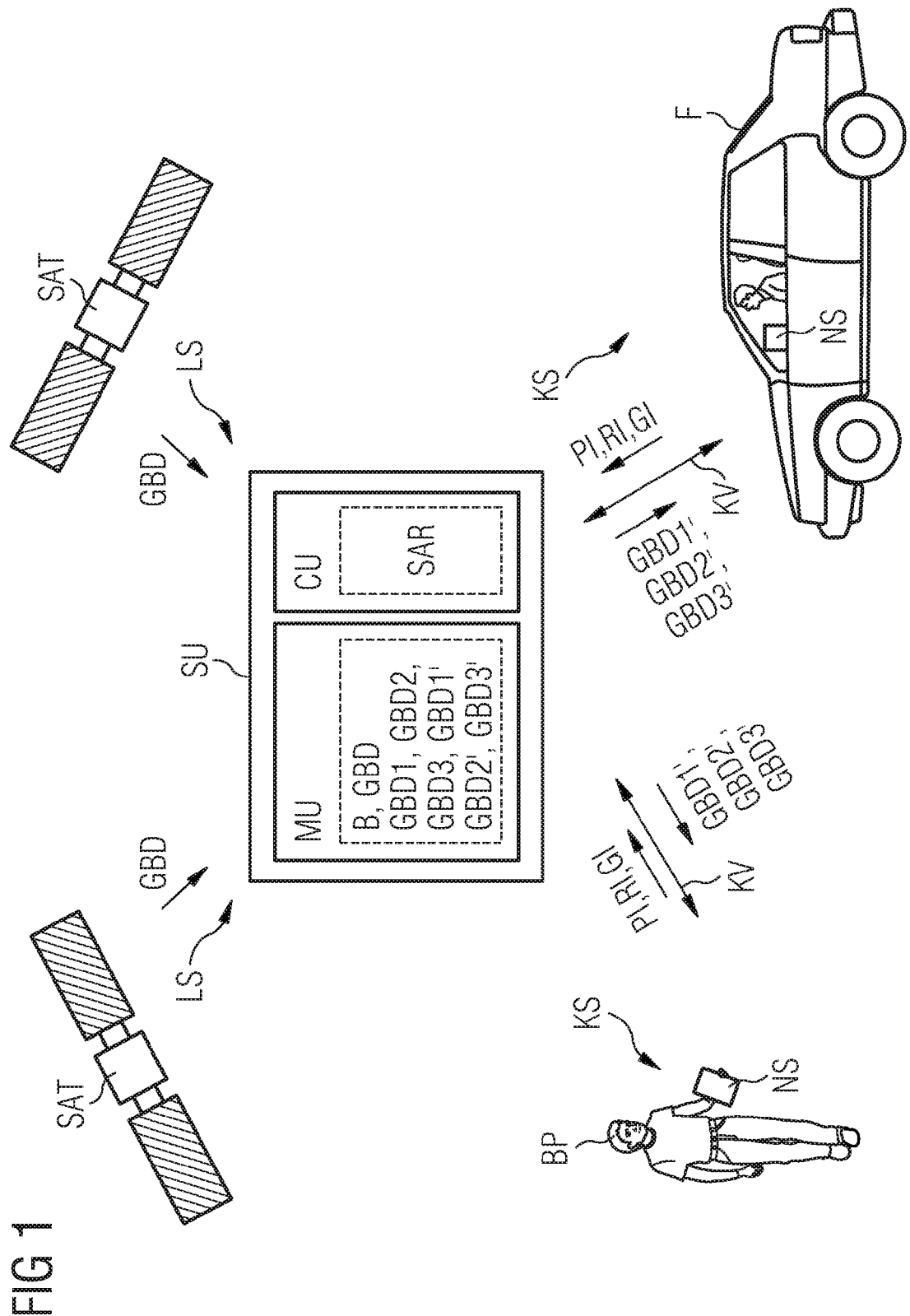
FIG. 1 is a pictorial block diagram of a system for the supply of compressed geoimage data.

Reference will now be made in detail to an exemplary embodiment illustrated in the accompanying drawings, wherein like reference numerals refer to like elements throughout.

In FIG. 1 a system S for receiving geoimage data GBD is shown by way of example in a schematic block diagram. The system S has at least one, e.g., centrally arranged, server unit SU which may be connected to a navigation system NS via at least one air interface LS with satellite units SAT and via at least one wireless communication interface KS.

In FIG. 1 by way of example two satellite units SAT are shown, via which the uncoded geoimage data GBD of a pre-defined geographical region B, for example of a country or a region, is produced and transmitted via the air interface LS to the server unit SU. The size of the surface area of the geographical region B is, for example, 0.1 to 1000 $km^2$.

The server unit SU has a processor unit PU and at least one memory unit MU, in which the uncoded geoimage data GBD of the geographical region B may be stored. The processor unit PU is configured for executing a control and evaluation routine, via which in particular editing, in particular encoding, of the geoimage data GBD stored in the memory unit MU or uncoded geoimage data GBD currently received by one of the satellite units SAT takes place. The encoded geoimage data GBD' may, for example, also be stored in the memory unit MU.

In an embodiment, the images of the geographical region B produced via the satellite units SAT are created at as high a resolution as possible, whereby considerable volumes of data of uncoded geoimage data GBD are produced which, however, permit a detailed reproduction of the geographical region B.

Figure 2:
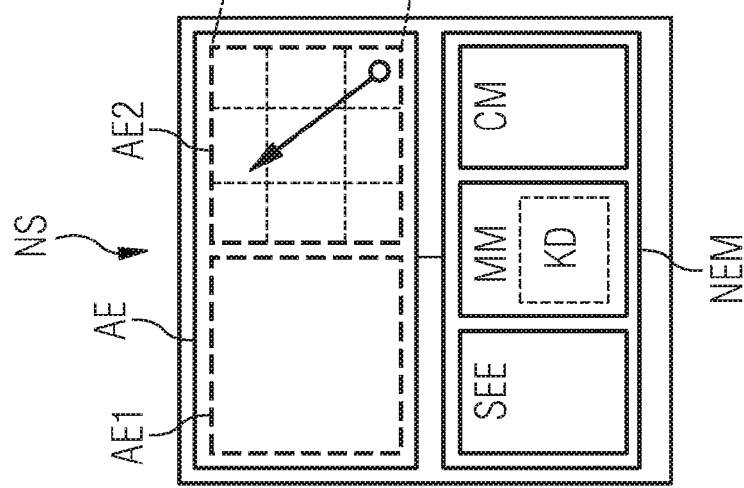

In FIG. 1 both a mobile navigation system NS, which for example an operator BP carries, and a navigation system NS fixedly incorporated in a vehicle F are shown. The design of such a navigation system NS is explained hereinafter with reference to a schematic block diagram according to FIG. 2.

The navigation system NS has one respective navigation receiver module NEM, to which at least one display unit AE is connected. The display unit AE may, for example, be implemented as a screen unit or display unit, in particular a "liquid crystal display" unit. In an embodiment, the navigation receiver module NEM includes a transmitter and receiver unit SEE, at least one memory medium MM and a processor unit CM. The memory medium MM may, for example, include a data carrier drive, in particular a DVD drive (not shown in FIG. 2), or may be able to be connected to such a data carrier drive. The memory medium MM is in this case provided, in particular, for receiving map data KD and optionally fixed geoimage data.

The display unit AE is, for example, subdivided into a first and second display portion AE1, AE2, in which different navigation information may be shown. For example, in the first display portion AE1 a map extract displaying the current location P of the object connected to the navigation system NS is shown. The map extract including the current location P is, for example, produced in the form of vector graphics, using the associated map data KD.

In the second display portion AE2, additional navigation information, such as for example real images of the surroundings produced by evaluating the fixed geoimage data may be shown, which for example are displayed as a background image in addition to the navigation information in the second display portion AE2. Thus the user of the navigation system NS obtains by the superimposition of such real images, a realistic impression of the surroundings relevant to the current location P.

The contemporaneous supply of geoimage data GBD allowing the creation of high resolution real images is not able to be implemented due to the limited transmission capacity of currently known communication interfaces KS. In order to permit the supply of such current geoimage data GBD by using an existing wireless communication point KS, an encoding is required of the geoimage data GBD' to be transmitted, e.g., in the centrally arranged server unit SU, by an image encoding method.

To this end, a communication link KV to the server unit SU is created by the navigation receiver module NEM. The current geoimage data GBD is requested from the server unit SU by the navigation receiver module NEM, via the existing communication link KV. At the same time, position information PI providing, for example, the current location P of the navigation receiver module NEM, is transmitted from the navigation receiver module NEM via the existing communication link KV to the server unit SU.

The navigation region and/or geographical region B is subdivided by the control and evaluation unit SAR into individual, e.g., square, geographical navigation segments A1-An, which may have the same geographical surface area and are arranged relative to one another in the manner of a checkerboard.

For example, the navigation segment Ap which includes the current location P of the object associated with the navigation system NS is determined according to the transmitted position information PI.

In an embodiment, directional information RI and/or speed information GI may be additionally transmitted with the position information PI. The directional information RI thus indicates the direction of movement and the speed information GI indicates the current speed of movement of the respective object associated with the navigation receiver module NEM, for example the operator BP or the vehicle F.

In the central server unit SU, by the control and evaluation routine SAR executed in the processor unit PU, the transmitted position information PI and possibly the directional information RI and/or speed information GI transmitted therewith is evaluated and according to which an expectancy range is determined. The expectancy range E may include the current location P of the object associated with the navigation system NS, as well as the geographical region which the object will probably soon reach, taking into account the movement direction thereof and the speed thereof. As a result, a lobe-shaped configuration of the expectancy range E may be produced, namely proceeding from the current location P towards the direction of movement of the object indicated by the directional information RI, in particular of the vehicle F.

The expectancy range E is defined in an embodiment by a plurality of navigation segments Ap, Ap−1, Ap+1, etc. adjacent to one another, within the context of detecting the expectancy range E, the navigation segment Ap including the current location P as well as the navigation segments Ap+1, Ap−1, etc. adjacent thereto, as well as the navigation segments Ap', Ap+1', Ap−1', etc. adjacent in the direction of movement which may be included, so that a sudden alteration to the direction of the vehicle F through the selected expectancy range E is also included.

In order to allow further deviations from the route and/or direction of movement calculated by the navigation system NS, the expectancy range E is increased by a buffer region PB, which surrounds the expectancy range E and is determined according to the selected expectancy range E. The buffer region PB may be formed by further navigation segments Ap+2, Ap−2, etc. adjacent to the expectancy range E.

Figure 3:
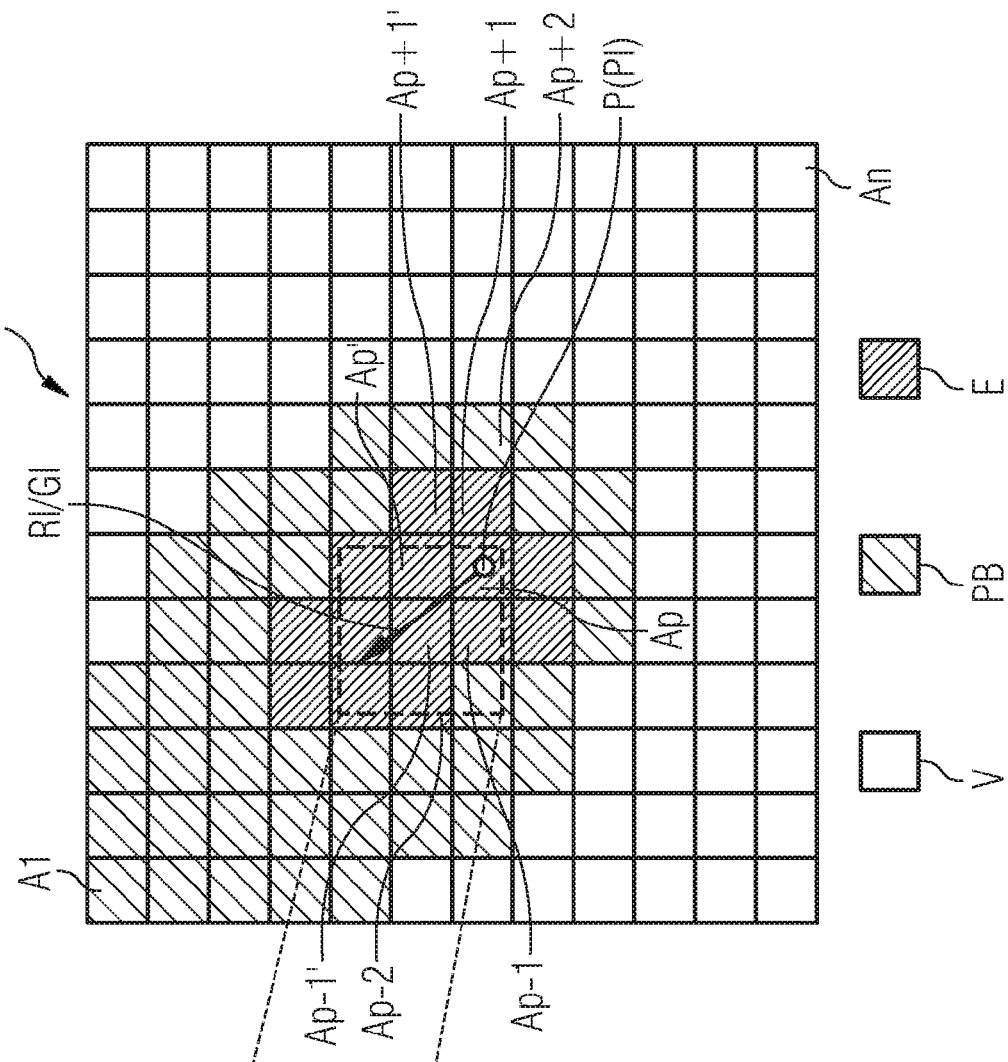
FIG. 2 is a schematic block diagram of a navigation system and FIG. 3 illustrates the subdivision of a geographical region into individual navigation segments as well as the various coding depths thereof.

In FIG. 3, by way of example the expectancy range E and the associated buffer region PB of the geographical region B is shown. The object associated with the navigation system NS moves in the direction indicated by the directional information RI and speed information GI, proceeding from the location P.

The remaining navigation segments reproduce the further coverage area V which may be reached within the geographical region B, which may be shown by the geoimage data GBD stored in the central server unit SU. Thus the geographical region B is divided into the expectancy range E, the buffer region PB as well as the coverage area V adjacent thereto.

If the geographical navigation regions Ap, Ap', Ap+1, Ap−1, Ap+2, Ap−2, etc. associated with the expectancy range E and the buffer region PB are determined, the associated geoimage data GBD is selected by the control and evaluation routine SAR, namely first geoimage data GBD1 reproducing the expectancy range E is determined and second geoimage data GBD2 reproducing the buffer region PB is determined. The remaining third geoimage data GBD3 is associated with the coverage area V.

Subsequently thereto, the first and second geoimage data GBD1, GBD2 may be encoded and the resulting first and second encoded geoimage data GBD1', GBD2' transmitted via the wireless communication interface KS to the navigation system NS. Additionally the third geoimage data GBD3 may also be subjected to encoding, and transmitted to the navigation system NS.

Encoding the first, second and third geoimage data GBD1, GBD2, GBD3 results in a considerable reduction in the data volume to be transmitted. To this end, various encoding methods may be used and/or various coding depths KD1, KD2, KD3 may be provided relative to a single encoding method.

In order to keep the quality losses as a result of encoding in the individual navigation segments Ap, Ap', Ap+1, Ap−1, Ap+2, Ap−2, etc. of the expectancy range E as low as possible, the first geoimage data GBD1 is encoded with a first encoding depth KD1 and the second geoimage data GBD2 with a second encoding depth KD2, the first encoding depth KD1 being selected to be higher than the second encoding depth KD2.

The third geoimage data GBD3 associated with the coverage area V is encoded with a third encoding depth KD3, which is markedly lower than the first and second encoding depths KD1, KD2. As a result it is ensured that the first encoded geoimage data GBD1' still contains sufficient image information in order to be able to show after the decoding thereof the geographical expectancy range E with sufficiently high resolution in the navigation system NS. The coding depth KD1, KD2, KD3 thus continues to reduce from the expectancy range E to the coverage area V as the distance from the current location P increases.

The first and second encoded geoimage data GBD1', GBD2' are received in the navigation receiver module NEM by the transmitter and receiver unit SEE thereof and processed further by the control unit CM, in particular decoded and possibly scaled and/or edited for display on the second display portion AE2 of the display unit AE. In a further embodiment, the edited first and second geoimage data GBD1, GBD2 may be enhanced by additional vector graphics, road information and/or further navigation information, which are superimposed on the real images of the expectancy range and/or buffer region E, PB produced by the first and second geoimage date GBD1, GBD2.

Additionally to the directional information and speed information RI, GI, an identification number ID individually associated with the navigation system NS as well as predefined characteristics of the display unit AE thereof such as for example resolution, number of colors, etc. within the context of a request, may be transmitted from the navigation system NS to the central server unit SU. By the identification number ID the respective navigation system NS may be clearly identified by the central server unit SU, i.e. the geoimage data GBD which has already been transmitted to the navigation system NS and/or the navigation receiver module NEM may be determined by the control and evaluation routine SAR. For updating the navigation receiver module only the transmission of the alterations occurring since the last transmission, namely so-called delta updates, is now required. As a result, a further reduction in the quantity of data to be transmitted is possible by using incremental encoding methods.

The encoded geoimage data GBD1', GBD2', GBD3' may also be determined for different roads and/or routes which are initially stored in the memory unit MU of the central server unit SU and if required may be retrieved by the navigation system NS, whereby a dynamic creation of alternative routes is possible.

The disclosed method may also be used as an enhancement for navigation systems NS with fixed geoimage data, which for example are provided on a local memory medium or the data carrier of the navigation system NS. To this end, for example when leaving the geographical region stored on the memory medium, the above disclosed communication link KV to the server unit SU is created, via which the necessary further geoimage data GBD may again be retrieved in encoded form, and possibly billable form, and thus a virtually enlarged coverage region is provided to the user of the navigation system NS.

Additionally, the encoded geoimage data GBD1'-GBD3' transmitted from the central control unit SU may be personalized, in particular, for fleet management applications. To this end, for example, the central control unit SU may be configured as a fleet management server unit which in addition to the encoded geoimage data GBD1'-GBD3' transmits traffic and/or weather information to associated navigation systems NS.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

The invention has been disclosed above with reference to one embodiment. It is understood that numerous alterations and modifications are possible without thereby departing from the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for supplying encoded geoimage data from a server unit to at least one navigation receiver module for a geographical region pre-defined by geographical image data stored in the server unit, via at least one wireless communication interface between the server unit and the at least one navigation receiver module, comprising:
    transmitting a message at least with position information from a navigation receiver module to the server unit;
    selecting an expectancy range within the geographical region by the server unit based at least on the position information;
    determining first geoimage data reproducing the expectancy range;
    encoding the first geoimage data in the server unit to produce first encoded geoimage data;
    transmitting the first encoded geoimage data from the server unit to the navigation receiver module via the at least one wireless communication interface;
    determining a buffer region surrounding the expectancy range based on the expectancy range selected;
    determining, by the server unit, second geoimage data for displaying the buffer region;
    encoding the second geoimage data to obtain second encoded geoimage data differing from the first encoded geoimage data by at least one of image encoding method and coding depth; and
    transmitting the second encoded geoimage data from the server unit to the navigation receiver module via the at least one wireless communication interface.

2. A method according to claim 1,
    further comprising transmitting directional information in addition to the position information from the navigation receiver module to the server unit, and
    wherein said selecting the expectancy range within the geographical region is based on the directional information, as well as the position information.

3. A method according to claim 2, further comprising transmitting speed information in addition to the position information, and
    wherein said selecting the expectancy range within the geographical region is based on the directional information and the speed information.

4. A method according to claim 1, wherein said encoding of the first geoimage data uses a first coding depth and said encoding of the second geoimage data uses a second coding depth, the first coding depth being higher than the second coding depth.

5. A method according to claim 4, wherein the geographical region is subdivided into a plurality of geographical navigation segments.

6. A method according to claim 5, further comprising determining an object navigation segment, including a current location of an object associated with the navigation receiver module, based on the position information transmitted by the navigation receiver module.

7. A method according to claim 6,
    further comprising determining adjacent navigation segments adjacent to the object navigation segment, and
    wherein said determining of the object navigation segment and the adjacent navigation segments occurs during said selecting of the expectancy range.

8. A method according to claim 7, further comprising transmitting an identification number, associated with the navigation receiver module, to the server unit.

9. A method according to claim 8,
    further comprising determining previously transmitted geoimage data which has already been transmitted to the navigation receiver module based on the identification number, and
    wherein said transmitting of the first encoded geoimage data transmits delta updates to the navigation receiver module describing alterations to the previously transmitted geoimage data occurring since a most recent transmission.

10. A method according to claim 6, further comprising:
    determining adjacent navigation segments adjacent to the object navigation segment based on the directional information, and
    adding the adjacent navigation segments to the expectancy range.

11. A method according to claim 10, wherein said determining of the buffer region determines further navigation segments adjacent to the expectancy range.

12. A method according to claim 11, wherein third geoimage data, remaining within the geographical region outside the first and second geoimage data, is associated with a coverage area.

13. A method according to claim 12, further comprising encoding the third geoimage data with a third coding depth, lower than the second coding depth by an amount greater than a difference between the first and second coding depths.

* * * * *